United States Patent [19]

Dettling

[11] 4,345,058

[45] Aug. 17, 1982

[54] URETHANE PREPOLYMER REPAIR SYSTEM

[76] Inventor: Theodore J. Dettling, 574 Castle Blvd., Akron, Ohio 44313

[21] Appl. No.: 286,641

[22] Filed: Jul. 29, 1981

[51] Int. Cl.$^3$ ............................................. C08G 18/48
[52] U.S. Cl. ................................... 528/48; 12/147 A; 12/34; 36/34 A; 36/35 R; 36/35 A; 36/72 B
[58] Field of Search ............................ 528/48, 57, 76; 428/423.1; 12/34 A, 147 A; 36/34 A, 35 R, 35 A, 72 B

[56] References Cited

U.S. PATENT DOCUMENTS

| | | | |
|---|---|---|---|
| 2,830,037 | 4/1958 | Carter | 260/77.5 |
| 2,901,467 | 8/1959 | Croco | 260/77.5 |
| 2,998,403 | 8/1961 | Miller et al. | 260/45.4 |
| 3,012,987 | 12/1961 | Ansul | 260/45.4 |
| 3,705,879 | 12/1972 | Brizgys | 260/77.5 |
| 3,746,665 | 7/1973 | Koleske et al. | 260/2.5 |
| 3,919,173 | 11/1975 | Coyner et al. | 260/77.5 |
| 4,110,317 | 8/1978 | Moraveck | 528/77 |
| 4,125,522 | 11/1978 | Becker | 528/61 |
| 4,182,898 | 1/1980 | Fujiwara et al. | 560/26 |

OTHER PUBLICATIONS

"The Development and Use of Polurethane Products", E. N. Doyle, Title Page, pp. 63–89, 93–125, and 225–231.
"Sealants", edited by Adolfas Damusis, 1967, Title Page, pp. 117–173.
Pamphlet, "Linde Molecular Sieves in Urethane Systems", by Union Carbide Corp.

*Primary Examiner*—Maurice J. Welsh
*Attorney, Agent, or Firm*—Theodore J. Dettling

[57] ABSTRACT

A urethane prepolymer repair system is provided by an isocyanate-terminated polytetramethylene ether glycol prepolymer of about 3,500–10,500 molecular weight that cures to an elastomer upon exposure to atmospheric moisture and is packaged in a container capable of repeatedly dispensing the prepolymer with minimal exposure to ambient air, such as a collapsible tube or caulking gun cartridge. The repair system is used to build up worn down soles and heels of footwear, repair separations of soles and heels from shoe tops, and hundreds of other uses.

13 Claims, No Drawings

URETHANE PREPOLYMER REPAIR SYSTEM

FIELD OF THE INVENTION

This invention relates to a new repair system. More particularly, it is directed to a repair system comprising a particular urethane prepolymer composition, curable in atmospheric moisture to a tough, abrasion-resistant elastomer, packaged in a container adapted to repeatedly dispense the prepolymer composition for multiple repair applications with minimal exposure to atmospheric moisture. The repair system can be used for hundreds of repairs, such as: building up worn down soles and heels of footwear; repairing separations of shoe soles and heels from the shoe top; and repairing separations, tears, and holes in articles made from rubber, leather, vinyl, fabrics, wood, and the like.

DESCRIPTION OF THE PRIOR ART

As early as 1934, efforts have been reported to provide means and materials for repairing rubber, leather, and composition articles such as shoes and raincoats. U.S. Pat. No. 1,981,769 describes a shoe repair cement of para crude rubber containing asbestos coated with white lead and magnesia. Subsequently, as new synthetic polymers have been developed, such as polychloroprene and styrene-butadiene-styrene block copolymers, they also have been used to make shoe repair cements. While these newer cements provide improved properties in some instances, all shoe repair cements exhibit some or all of the following deficiencies. (1) Relatively low total solids (about 45% maximum). This causes cement repairs to shrink as they dry. Thus, it is necessary to apply two, three, and sometimes more cement layers to make thick repairs resulting in extra labor and inconvenience. In addition, some cements require drying times as long as 24 hours between successive applications. (2) Poor-to-mediocre abrasion resistance. Because shoe repair cements set up merely by evaporation of solvent, they retain their thermoplastic character and hence exhibit appreciably poorer physical properties, and particularly abrasion (wear) resistance, than the leather or crosslinked rubber soles or heels to which they are applied. (3) Greater hardness, and poorer resiliency and traction. Cements based on hard or semi-hard resins, such as vinyl-type plastic resins and styrene-butadiene-styrene block copolymers, have greater hardness (typically 85 or more Shore A hardness) than the 60 to 70 Shore A hardness of the rubber soles and heels typically used on athletic shoes. As a consequence, these hard resin cements give repairs that are less flexible and have poorer traction than the athletic shoe soles they are repairing. Also, the lack of elasticity and flexibility of hard resin cements tend to promote premature delamination of the repair in areas of the sole where flexing is greatest. (4) Finally, most shoe repair cements exhibit at best marginal adhesion to soles and heels made with urethane rubber, which increasingly is being used because of its excellent wearing properties.

In another approach, shown in U.S. Pat. No. 2,420,187 (1947), worn rubber heels are rebuilt with one or more layers of solid rubber material cut to the shape of the worn area and cemented in place. Alternately, in a newer method using thermoplastic urethane rubber wedges, the worn area is cut out and sculptured to fit the wedge before cementing. While providing repairs having excellent overall physical properties and durability, it is obvious that in either method great skill and care must be exercised and considerable time expended to produce repairs having the thickness and configuration of the original sole or heel. Most people do not have either the skill or the inclination to make satisfactory repairs utilizing this method.

In still another approach, two-part urethane resin casting systems have been used to rebuild worn shoe soles or heels. While overcoming some of the deficiencies of shoe repair cements, and especially the shrinkage problem, they present other difficulties and deficiencies. One difficulty is the necessity to accurately measure out and completely mix the two components to achieve the claimed properties. This can be time consuming and messy, and hence unacceptable to the majority as a viable shoe repair method. Another deficiency is the limited time one has to mold or case the mixture onto the shoe before the onset of gelation, which terminates the useful repair fabrication properties of the mixed resin. Still another problem with two-part urethane resin systems is their adhesion to rubber and synthetic polymer soles and heels which is mediocre at best. A final deficiency in many urethane resin systems, and particularly those most practical for use by an individual, is their average abrasion resistance, which is usually less than half that of typical rubber soles and heels.

SUMMARY OF THE INVENTION

It is a general object of this invention to provide a system for repairing and rebuilding the soles and heels of all kinds of shoes—athletic, sport, dress, work, and the like—that possesses the best features of each of the prior art methods without, either to a greatly diminished extent or even completely, their drawbacks and deficiencies.

In particular, it is an object of this invention to provide a repair system that has or virtually duplicates: the ease of application of shoe repair cements, the excellent physical properties and durability of shoe repair patches, and the non-shrinking characteristics of two-part urethane resin systems, which allows repairs to be tailor made to the exact thickness and configuration of the worn-down area.

A further object is to provide a system to repair: seaparations of the shoe top from the heel or sole; and tears, rips, holes, or separations in shoe uppers, rainwear, luggage, tents, boots, wadders, and like consumer goods made with or from leather, rubber, cork, urethane and vinyl resins, wood, and all kinds of fabrics except those made with polyethylene or polypropylene.

These and still other objects and advantages, which will become apparent from the following description and claims are provided by a urethane prepolymer repair system comprising a urethane prepolymer composition, curable in atmospheric moisture to an elastomer, having a total solids of 60-100%, a cured Durometer hardness of 50-90 Shore A, a cured 100% modulus of at least 200 psi and a shelf life of at least 30 days upon aging at 120° F. The urethane prepolymer composition contains a urethane prepolymer made essentially from a polytetramethylene ether glycol or mixtures of glycols having a hydroxyl equivalent weight of about 300-2,000, and a stoichrometric excess of an organic polyisocyanate. The polytetramethylene ether glycol urethane prepolymer has an isocyanate (NCO) content of about 0.8-2.4% and an average molecular weight of about 3,500-10,500. The urethane prepolymer composition is packaged in and dispensed from a moisture-impermeable container having a closable dispensing orifice and means to reduce the volume of the container and thereby extrude the urethane prepolymer composition through the orifice without introducing ambient air into the container.

The repair system is used for hundreds of repair applications, such as: building up worn-down soles and heels on all kinds of footwear; and repairing separations, tears, and holes in products made from rubber, leather, vinyl, textiles, wood, cork, and other substrates to which the urethane prepolymer composition adheres.

DESCRIPTION OF THE PREFERRED EMBODIMENTS

In the following description and claims, all parts or percentages are by weight, unless otherwise stated.

The prepolymer composition of the invention repair system has the following properties, determined by the appropriate chemical and standard ASTM test methods, in the original and cured state.

(a) Prepolymer composition total solids of about 60% to 100% with a minimum of about 70% being preferred to minimize shrinkage.

(b) A cured Durometer hardness of about 50 to 90 Shore A, with a hardness of 55 to 75 being preferred.

(c) A cured 100% modulus of at least 200 pounds per square inch (psi) with a 100% modulus of 300 psi or more being preferred.

(d) Prepolymer composition shelf life (stability) such that it can be aged in a blind-opening collapsible metal tube, which has an orifice size of one quarter inch and is free of moisture, for 30 days at 120° F. and still be squeezed from the tube after puncturing the blind opening to its maximum opening size.

The prepolymer composition has a viscosity at 25° C. of about 10,000 centipoises up to a plastic solid that can be squeezed out of a collapsible tube having an orifice size of one quarter inch. Preferred is a viscosity of at least 50,000 centipoises up to a very viscous fluid that just levels itself on a horizontal surface.

The curing rate of the prepolymer composition is such that a cast 20-mil. layer cures to an elastic sheet in less than 72 hours at a temperature of at least 72° F. and a relative humidity of at least 50%. Curing rates of less than 48 hours are preferred.

When the invention repair system is used to build up worn down soles and heels of footwear, the cured prepolymer composition requires at least 250 revolutions to wear away 0.1 inch in a modified National Bureau of Standards abrasion test (ASTM D 1630-61). The test is modified in two respects. First the wear resistance is expressed as the number of revolutions to wear away 0.1 inch rather than as a ratio based on the number of revolutions required to wear away 0.1 inch of a control compound. The second modification is required by the liquid nature and curing mechanism of the prepolymer composition. Rather than being molded and cured with heat and pressure as are solid curable rubber compositions ordinarily tested by the ASTM test, the urethane prepolymer composition test test block is made by casting the prepolymer composition into a 1×1 inch steel frame mold one-quarter-inch thick coated with a silicone release agent and having centered on the bottom of the 1×1 inch opening a piece of a cured black natural rubber composition of 1⅜×1⅜×⅛ inch dimensions. After curing to a solid throughout (about 3 to 4 days depending on the prepol composition, humidity, and temperature), the test block is removed from the mold and allowed to cure further for a total of at least eight days before testing. Temperatures of 72° to 100° F. and relative humidities of 40% to 100% are used for curing.

The prepolymer composition of the invention repair system consists essentially of an isocyanate-terminated urethane prepolymer made by reacting a stoichiometric excess of an organic polyisocyanate with a single polytetramethylene ether glycol or mixture of such glycols having an average hydroxyl equivalent weight of about 300 to 2,000. The prepolymer composition may, in addition, be made with and contain other prepolymer precursors and adjuvants. The polytetramethylene ether glycol prepolymer resulting from this polymerization reaction has an isocyanate (NCO) content of about 0.8% to about 2.4%, with the preferred range being about 1.1% to about 1.9%; and an average molecular weight of about 3,500 to about 10,500, with a molecular weight of about 4,500 to 7,500 being preferred.

While prepolymer compositions made with polytetramethylene ether glycols or mixtures thereof of about 300 to 2,000 average hydroxyl equivalent weight give good repairs, glycols or glycol mixtures of about 450 to about 1,600 average hydroxyl equivalent weight are preferred, being easier to use and/or giving somewhat better wear resistance.

The tetramethylene ether glycol and any other optionally used active-hydrogen-containing reactants, hereinafter described, are reacted with a stoichiometric excess of one or more organic polyisocyanates to make the invention prepolymer. Illustrative of suitable organic polyisocyanates are 2,4-toluene diisocyanate alone or mixed with 2,6-toluene diisocyanate (TDI), 4,4-diphenylmethane diisocyanate (MDI), polymethylene polyphenyl isocyanate (PAPI), 1,5-naphthalene diisocyanate (NDI) 1,6-hexamethylene diisocyanate (HDI), 4,4-dicyclohexylmethane diisocyanate ($H_{12}$MDI), xylene diisocyanate, and isophorone diisocyanate. Because of its relative nontoxicity, and the good adhesion and quick curing properties it imparts to the prepolymer, MDI is preferred. When more than one organic polyisocyanate is used, they can be added together or separately at various times during the polymerization reaction to give prepolymers having isocyanate molecule moieties in the interior of the prepolymer differing from those terminating the prepolymer, as is known to those skilled in the art.

In the following description of other ingredients that may be used to make the prepolymer composition of the invention repair system, the following provisos apply. Other prepolymer precursors and adjuvants used in the prepolymer composition are only used, and then only in such quantities, as will provide prepolymer compositions having the property parameters hereinbefore delineated. Further, any kind or quantity of prepolymer precursor or adjuvant hereinafter described are given by way of example only, and are not to be construed as defining or limiting the invention.

Other prepolymer precursors containing one or more active hydrogen groups that may be used in combination with the polytetramethylene ether glycol to make the invention prepolymer composition include other types of polymeric polyether polyols having molecular weights of about 500 to 5,000, such as the condensation products of ethylene and/or propylene oxide with low-molecular-weight alcohols, glycols, and triols. Polyester polyols of about 500 to 4,000 molecular weight, like those shown in U.S. Pat. No. 4,182,989, made from the condensation of polycarboxylic acids and anhydrides with polyols may also be employed. More preferred, though, are lactone polyesters, such as polycaprolactone and other lactone polyesters described in U.S. Pat. No. 3,051,687, preferably having a molecular weight of 500 to 3,000. Another useful prepolymer precursor is castor oil, blown castor oil or the transesterification derivatives of castor oil. Generally, the quantity of these other polymeric polyol compounds used will not exceed the weight of polytetramethylene ether glycol. Further, mixtures of polyether, castor oil or its derivatives, and polyester polyols may be used.

Still another type of prepolymer precursor that may be used are low-molecular-weight polyols, such as ethylene glycol, 1,4-butanediol, 1,4-cyclohexane diol, diethylene ether glycol, tripropylene ether glycol, trimethylol propane, and mixtures thereof. These low-molecular-weight extenders give harder cured polymers and decreased prepolymer flowability. Typically, up to about one equivalent of the extender may be used for every two equivalents of the polytetramethylene ether glycol and any other high-molecular-weight polyol present in the prepolymer though larger amounts up to a 1 to 1 equivalency ratio may be used, if desired. In some instances, a small quantity of a monohydroxyl polyether, polyester, or low-molecular-weight extender compound may be advantageously used.

Finally, as is known, hydroxyl terminated urethane prepolymers of these aforedescribed prepolymer precursors made with an NCO/OH ratio of less than 1.0 may be used.

Generally, it has been found that the prepolymer compositions of this invention exhibit improved stability when prepolymer precursors containing more than two reactive groups (either NCO or OH) are not used in the prepolymer, or if used, then in an amount not exceeding that which would cause the polytetramethylene ether glycol prepolymer to form a three-dimensional network during polymerization and gel.

In most prepolymer compositions, about 5 to 40% of the composition is comprised of a non-reactive volatile organic solvent, non-volatile organic plasticizer, or mixtures thereof, to decrease viscosity, limit the speed of prepolymer formation and resulting exotherm, and increase prepolymer stability. Examples of useful solvents are toluol, xylol, heptane, mineral spirits, methyl ethyl ketone, methyl isopropyl ketone, ethyl acetate, butyl acetate, 1,1,1-trichloroethane, perchloroethylene, ethyl ether acetate, and mixtures thereof. Suitable plasticizers include, for example, dibutyl phthalate, dioctyl phthalate, tri-cresyl phosphate, triphenyl phosphate, chlorinated biphenyls and polyphenyls, aromatic oils, and mixtures thereof—care being taken to choose plasticizer(s) and quantity(s) that are compatible with the prepolymer both before and after curing. Toluol, xylol, and their mixtures are preferred because of their low-water content, low cost, and the good physical properties obtained. Some solvents, such as the chlorinated solvents, seem to inhibit cure and hence require for best results, the use of a catalyst, or more catalyst then otherwise would be used. For this purpose, an amine (or other alkaline) catalyst, either by itself or in combination with an organo metallic catalyst may be used.

Another ingredient that may be used in the prepolymer compositions are molecular sieves—crystalline metal aluminosilicates, generally known as "zeolites''—preferably in the powder form. Particularly preferred are the Type A sieves available from Union Carbide Corporation under the trademarks Linde Type 4A (sodium form) and 5A (calcium form). Type X sieves, such as Linde Type 13X, have been found more difficult to use, giving at times prepolymer compositions having poor long-term stability. Molecular sieves scavenge any moisture present in the ingredients, lower viscosity, and in quantities in excess of that required to scavenge any free moisture present in the prepolymer precursors and adjuvants, decrease carbon dioxide bubbles in cured repairs and particularly those having a thickness of more than 20 mils. One way to determine this water-scavenging quantity is to run a series of recipes having increasing increments of the molecular sieves to see what minimum quantity is required to give a prepolymer composition stable for 30 days at 120° F., as hereinbefore described. In another technique, the total quantity of water in the quantities of the prepolymer composition ingredients being used is determined analytically and about 5 to 10 times this measured weight of water is assumed to be the quantity of molecular sieve required to be added to scavenge this water. Preferably, an excess of at least 0.3% (based on 100% of the polytetramethylene ether glycol prepolymer) of molecular sieves is employed, and more preferably about 0.5% or more. Approximately a 4% excess of the molecular sieves is the practical maximum because of its cost and its inhibiting effect on the prepolymer composition cure rate. When 0.5% or more quantity of molecular sieves are employed, a catalyst, as hereinafter described, may be used to advantage to counteract this cure-rate-inhibiting effect. It is critical that any molecular sieves used in the invention prepolymer composition be handled so as to keep to a minimum any extraneous moisture pickup from the atmosphere. If the sieves pick up any appreciable amount of water, they can not function effectively as a water scavenger, and also seem to act as a crosslinking agent giving unstable prepolymer compositions. Lastly, molecular sieves loaded with crosslinking and extending amines or ammonia (chemically loaded molecular sieves) when incorporated into the prepolymer composition and exposed to moisture, release the amines or ammonia to give a faster curing composition with fewer carbon dioxide bubbles.

Another ingredient which may be used in the prepolymer composition is a catalyst, or mixture of catalysts, to accelerate the rate of cure of the prepolymer composition. While a catalyst is not required for many prepolymers, the use of a small amount, on the order of about 0.001 to 0.5% based on the polytetramethylene ether glycol prepolymer—the quantity used depending on the type of catalyst and the type and quantity of isocyanate groups terminating the prepolymer—can speed up the cure from 50 to 2,000%. This can be important in prepolymers terminated with aliphatic isocyanates or the slower-curing aromatic isocyanates such as TDI, because it allows them to cure in reasonable lengths of time. Further, as previously pointed out, the use of a catalyst may be desirable when ingredients, such as chlorinated solvents or more than 0.5% molecular sieves, that retard the prepolymer curing rate are used in the prepolymer composition. In any event, the type and quantity of catalyst(s) used should be such as not to cause gelation of the prepolymer composition when it is aged 30 days at 120° F. Another factor determining the quantity of catalyst employed is the quantity of carbon dioxide bubbles acceptable in the repair—the faster the cure the more bubbles. Also, faster cures appear to give repairs having poorer adhesion to rubber substrates. One way to minimize these problems is to use, as previously described, a higher loading of molecular sieves, for example 0.5 to 2%, in the catalyzed, faster-curing prepolymer compositions. In place of or supplementing the molecular sieves, basic pigments, such as basic lead silochromate-barium metaborate, may be used as carbon dioxide scavengers. Illustrative of catalysts that may be used are: tertiary amine catalysts such as 1,4-diazabicyclo (2,2,2) octane, N,N,N,N-tetramethyl-1,3-butane-diamine, 1,2,4-trimethylpiperazine, and the like; and organo metallic catalysts such as ferric acetylacetonate, tetrabutyl titanate, cobalt acetylacetonate, the tin catalysts described in U.S. Pat. No. 3,392,153, and the mercury catalyst described in U.S. Pat. Nos. 3,579,553, 3,583,945, and 3,779,794. Catalyst adjuvants may also be used to modify the catalyst, as for example ether compounds and complexes of $BF_3$ as shown in U.S. Pat. No. 3,705,879 to tie up amine catalysts and thus improve prepolymer stability. It has been found that 0.005 to 0.05% of organo mercury compounds sold by Cosan Chemical Corporation under the trademarks COCURE 20, 30, 31, and 32, and 0.01 to 0.1% of trimethyl-piperazine have given increased cure rates with retention of prepolymer stability, and are hence preferred.

Other ingredients that may be used in the prepolymer composition, if required for the specific properties they impart, include: stabilizers, such as pyrogallol, hydroquinone, tertbutyl catechol and benzaldehyde; antioxidants, such as 2,6-di-t-butyl-p-cresol; styrenated phenol and fortified hindered phenols; ultra-violet absorbers, such as 2,4-dihydroxybenzophenone and 2,2-dihydroxy-4-methoxybenzophenone; pigments, such as colored iron oxides and rutile titanium dioxide; fillers such as talc, silica, china clay, glass flakes, chopped fiberglass, particulate or fibrous vulcanized soft or hard rubber compounds; leather dust or particles, polyester and polypropylene fibers; and flow agents such as phthalic glycerol alkyl alkyd resins.

Besides the conventional means of modifying flow properties, such as using glass or synthetic polymer fibers, the viscosity and flow characteristics of the prepolymer composition, as well as its initial uncured cohesive properties, may be modified by employing about 0 to 50% by weight, in the prepolymer composition, of a non-reactive resin- or rubber-like polymer soluble in and compatible with the polytetramethylene ether glycol prepolymer and any solvent and/or plasticizer used. Examples of potentially useful modifying solid polymers include: polychloroprene rubbers, acrylate or methacrylate polymer and copolymer resins, butadiene-styrene-butadiene block copolymers, acrylonitrile-butadiene and styrene-butadiene rubbers, and the like. Also, low-molecular-weight, non-reactive, solid natural and synthetic resins, soluble in and compatible with the polytetramethylene ether glycol prepolymer, may be used for modifying the viscosity and cured properties of the invention compositions. Examples of such resins are rosin and the chemically modified rosins, oil-soluble phenol-aldehyde resins, terpene phenolic resins and polymerized $C_5$ hydrocarbon resins.

Yet another way of modifying the viscosity and cured properties of the prepolymer composition is by adding to the polytetramethylene ether glycol prepolymer after it has been formed, a second type of prepolymer that has isocyanate end groups and is compatible with it. Such added prepolymers may vary in average molecular weights from very low, for example about 400, to very high, for example 20,000 or more; and may be made with the low-molecular-weight polyols, other polyether polyols, castor oil or its derivatives, or polyester polyols hereinbefore described, or with mixture of these other active-hydrogen-group-containing materials. Generally, the weight of any other prepolymer(s) used will not exceed the weight of the tetramethylene ether glycol prepolymer(s) in the invention prepolymer composition.

Finally, if deemed desirable, the invention prepolymer compositions may be modified with just an organic polyisocyanate. However, this is less desirable than using a low-molecular-weight prepolymer such as previously described-free unreacted isocyanate compounds are more volatile and hence potentially toxic, and some have a tendency to dimerize. If these other modifying prepolymers or free isocyanates are used, the NCO content of the prepolymer composition may be more or less than the 0.8–2.4% isocyanate content of the polytetramethylene ether glycol prepolymer.

By way of summary, when it is desired to increase the viscosity of the prepolymer composition and, in some instances even impart thixotropic properties, this may be achieved by one or more of the following means: increase the total solids of the prepolymer composition; increase the average molecular weight (and decrease the NCO content) of the polytetramethylene ether glycol prepolymer and/or any prepolymer adjuvants used in admixture therewith; use, or increase the quantity used of, low-molecular-weight diols and/or polyols having more than two hydroxyl groups, in making the prepolymer and/or any adjuvant prepolymer used in the prepolymer composition; use, or increase the quantity used of, particulate and/or fibrous type filler in the prepolymer composition; use, or increase the quantity used of, modifying solid polymers, such as butadiene-styrene-butadiene block copolymers and the like, previously described; and so forth as will be apparent to those skilled in the art from the foregoing description. The converse of the foregoing means decreases the viscosity of the prepolymer composition.

Further, and again by way of summary of the disclosure herein, one, more, or all of the cured prepolymer composition properties of hardness, 100% modulus and abrasion resistance are increased by one or more of the following means: decrease the average molecular weight (and increase the NCO content) of the polytetramethylene ether glycol prepolymer and/or any prepolymer adjuvant used in the prepolymer composition; use, or increase the quantity used of, low-molecular-weight diols and/or polyols having more than two hydroxyl groups, in making the prepolymer and/or any adjuvant prepolymer used in the prepolymer composition; use symmetrical diisocyanates; use, or increase the quantity used of, catalyst in the prepolymer composition; use, or increase the quantity used of, particulate and/or fibrous-type filler in the prepolymer composition; use, or increase the quantity used of, hard, rigid-type natural or synthetic polymers or resins in the prepolymer composition; use, or increase the quantity used of, reinforcing type pigments such as furnace black or colloidal silica; and so forth as will be apparent to those skilled in the art. The converse of the foregoing means decreases one, more, or all of these particular cured physical properties.

The prepolymer compositions of the invention repair system are made by the usual methods known to those skilled in the art, except that, in a preferred method, the polytetramethylene ether glycol prepolymer is only partially polymerized prior to the prepolymer composition being loaded into containers as described hereinafter. Illustrative of prior art references that teach methods of making prepolymer compositions that may be used, which are incorporated herein by reference for these teachings as well as their teachings of prepolymer precursors and adjuvants that may be used in the prepolymer composition, are:

(1) Sealants by Adolfas Damusis, Reinhold Publishing Corp., 1967.

(2) *The Development and Use of Polyurethane Products* by E. N. Doyle, McGraw-Hill Book Co., 1971; and (3) U.S. Pat. No. 3,919,173.

Thus, as is known, it is necessary that water be removed from the ingredients before being used to make the prepolymer composition. Useful methods include vacuum drying, azeotropic distillation, or the use of molecular sieves or other water scavengers such as anhydrous calcium sulfate. In another method, pigments, fillers, and other particular or fibrous adjuvants are pretreated with a polyisocyanate. Further, as is known, the manufacture of the invention composition and its loading into containers must be done under anhydrous conditions, such as under a blanket of dry nitrogen gas. Bearing in mind these general caveats, following is an example of a procedure that is used to make the prepolymer composition of the invention repair system.

The polytetramethylene ether glycol(s) and any other high-molecular-weight polyol used, heated to about 160° F. and liquid, are charged to the reasctor; solvent and/or plasticizer added carefully so as to form a separate layer thereabove; then, if used, low-molecular-weight polyol, molecular sieves, catalyst, pigment, filler or any other adjuvant ingredient readily dispersible by a high shear mixer (such as a Cowles mixer) are added, and the whole batch vigorously agitated till homogeneous. When a solid rubber or resin is used, it may first be dissolved in some or all of the solvent. The organic polyisocyanate(s) is then added and the batch mixed till homogenous. At this point, the batch may be reacted for sufficient additional time at about 120°–160° F. to give 50–100% prepolymer formation before filling the containers, or the batch may be immediately placed in the hopper of a container-filling machine and filling of the containers commenced. If the filling operation requires any appreciable time the batch will continue to polymerize so that the first containers are filled with a prepolymer composition only incipiently polymerized while the last are filled with a prepolymer composition that may be as much as 50% polymerized. If the prepolymer composition is not essentially 100% polymerized, the filled containers are aged at a temperature from ambient up to about 140° F. for a period sufficient to virtually complete the polymerization of the polytetramethylene ether glycol prepolymer. This time will vary depending on the type and quantity of prepolymer precursors, and catalyst if used, as for example from 12-48 hours at 140° F. up to 7-30 days at 75° F. The method where the prepolymer is only incipiently up to about 50% polymerized during the container-filling operation is preferred: the prepolymer composition is less viscous facilitating filling and filtering, if required; and the prepolymer composition seems to be more stable when polymerization is completed in the container.

When a second type of prepolymer is used in combination with the polytetramethylene ether glycol prepolymer in the prepolymer composition, this preferred method would not be used when it is desired to maintain the homogeneous integrities of the two prepolymers. Nor would this method be used, when two polytetramethylene ether glycols prepolymers of different molecular weights are blended together to provide the prepolymer composition and the molecular weight integrity of both is to be maintained. However, if the homogeneities or the molecular weights of prepolymers being blended together to make the prepolymer composition are not critical, this preferred method of completing the polymerization in the container may be used. One way this may be done is: first 50–100% polymerize one of the two prepolymers, admix thereinto the precursors of the second prepolymer, fill the container with the admixture, and complete the polymerization of the prepolymer composition in the container. The degree of polymerization of the first prepolymer and the kind and quantity of prepolymer precursors subsequently added are chosen to give a prepolymer composition having the aforedescribed property and composition parameters.

In filling the containers with the prepolymer composition, it is advantageous to maintain the composition at an elevated temperature, as for example 110°–140° F. depending upon the boiling points of any solvents used and the average molecular weight of the polytetramethylene ether glycol prepolymer. The elevated temperature increases solvent vapor above the prepolymer composition which can help exclude atmospheric moisture; and secondly it lowers the viscosity of the prepolymer composition which is important when little or no solvent is used and/or the prepolymer composition is 50–100% polymerized before filling.

The container used in the invention repair system can be generally described as a moisture-impermeable container having a closable dispensing orifice and means to reduce the volume of the container and thereby extrude the prepolymer composition through the orifice onto the article being repaired without introducing ambient air into the container. Most typical of this type container, and hence preferred, are collapsible moisture-impermeable metal or plastic tubes, or moisture-impermeable caulking gun cartridges having a movable piston at one end to expel the contents and a dispensing orifice at the other end. For absolute assurance against accidental moisture pickup, in the most preferred embodiment, the container has its orifice sealed with a moisture-impermeable seal, such as a metal foil in a cartridge or an intergral metal plug in a metal tube ("blind-opening" tube), which is punctured before using. After use, the container orifice is reclosed and resealed with a closure means having little or no moisture permeability, such as a metal or polyolefin screw cap for tubes and cartridges having a threaded orifice, and a metal foil or polyolefin tapered friction-fit closure plug for containers not having a threaded orifice. Even if the seal of the reclosure is not perfect, only a thin layer of the prepolymer composition in the orifice neck cures to form what is in essence a sealing plug (of about 1/16 to ¼ inch thickness) protecting the remaining contents of the container from geling. If present, the plug can be removed or punctured and the remaining prepolymer composition in the container used for repairs. Ideally, reclosure means are chosen that prevent even this small quantity of prepolymer gelation. In either case, it is apparent that the invention composition in these kind of containers can be used again and again (multi-usable)

over a considerable period, as for example, 6 months or more, and that when the composition is used up, the container is discarded.

One valuable use of the invention repair system is to build up and restore worn down areas on the soles and heels of all kinds of shoes and footwear—athletic, sport, dress, work, and the like. This is easily done in the following manner. If not clean, the worn-down area to be restored is cleaned, preferably with a rag soaked with an oil dissolving solvent such as toluol, paint thinner (mineral spirits), or nail polish remover. Alternatively, an oil-removing aqueous detergent solution may be used followed by a water rinse and drying. For maximum adhesion, the area is first buffed or roughened with sandpaper, a wire brush, or the like before cleaning. For thick repairs at the edge of the sole or heel, a pressure-sensitive adhesive tape (masking, electrical, surgical, and the like) is adhered to the edge to form a dam to restrain the prepolymer composition, if flowable, and also, in any event, to form a mold for the repair so that it will have the same configuration as the area being repaired. If the prepolymer composition being used has little or no flow, or the restoration is thin (e.g., 20–70 mils), or an exact duplication is not deemed necessary, then no tape dam need be used. The orifice of the container (usually a blind-opening collapsible metal tube for most consumer-repair applications) is then punctured, and the prepolymer composition applied therefrom to the area in a quantity sufficient to cover the area to the desired thickness, and spread over the area and leveled with a wood stick, knife, or like means. The repaired sole or heel area is maintained facing up and level (at which time flowable prepolymer compositions will self level to give a flat repair) until the prepolymer composition solidifies—typically 12–36 hours, depending upon the repair thickness and the relative humidity. At that time, any pressure-sensitive tape dam employed can be removed with care. The repair is then allowed to cure further, if required, to give a tough elastic repair having the characteristics previously delineated. Typically, about 24–72 hours are required to achieve this state of cure at normal humdities of about 30% or greater, the time depending upon the repair thickness, the curing speed of the prepolymer composition, and ambient temperature and relative humidity.

When a repair having modified texture, consistency and/or properties is desired, one or more particulate or fibrous natural or synthetic rubbers, polymers or resins (cured or uncured), leather, wood, cork, synthetic or natural fibers, fillers, reinforcing agents, sand, and the like, such as hereinbefore described, may be applied such as by sprinkling or dusting onto the surface of the repair, while it is still tacky and adhesive, typically 0 to 60 minutes after casting the prepolymer composition. Application of such particulate and/or fibrous materials within 0–15 minutes after casting gives more penetration and hence modification of the prepolymer composition to a greater thickness, while later application, such as 45–60 minutes after casting, provides modification only at or near the surface. For maximum thickness modification, the material(s) may be pressed into the repair while it is still fluid with a stick, knife, or the like. Irrespective of the method employed, after the prepolymer composition has cured, the modifying materials(s) is tenaciously embedded in and/or adhered to the repair. Typical shoe repair elements do not realistically provide this modification option: they dry and skim over too rapidly and/or their adhesion to the modifying materials is mediocre at best.

Surprisingly, even though thick repairs (for example 100 mils. plus) made with many of the prepolymer compositions contain considerable trapped carbon dioxide bubbles (ranging from small to rather large and located throughout the repair thickness and/or near the repair interface with the restored heel or sole), adhesion, wear resistance, and durability of the repairs is still good to excellent. In addition to not significantly affecting the quality of the repairs, the carbon dioxide bubbles offer a positive advantage—the volume of the bubbles compensates for any shrinkage that would otherwise occur in prepolymer compositions containing any appreciable solvent, such as 10–40% by weight, so thick repairs can be made exhibiting only slight to no shrinkage. A still further advantage of the entrapped bubbles are that they give repairs having lower softness and better shock-absorbing properties than would otherwise be obtained. As a practical matter, repair thicknesses will vary from about 10 to 20 mils (0.020 inches) minimum up to about 375 mils maximum, with the typical thickness being about 30 to 250 mils. Because of their excellent elasticity, flexibility, and adhesion to all heel and sole materials—rubber, vinyl, leather, and so forth—restorations made with the invention prepolymer composition seldom delaminate no matter how severe the service to which they are exposed. A further advantage of the repairs are that they are oil- and heat-resistant. In addition, the elasticity and softness of prepolymer compositions in the 50 to 75 Shore A hardness range give repairs having flexibility and traction characteristics equal to those of soles and heels used on athletic and sport shoes. In this connection, if footwear having large areas of the sole or heel restored with the invention prepolymer composition may be used on slippery surfaces (such as snow, ice, or wet smooth floors or rocks), an added step is required to give good traction on these surfaces. About 60–120 minutes after casting the prepolymer composition onto the area being restored, and while still tacky, table salt or sugar is sprinkled over the entire restored area, and after the repair has cured, the salt or sugar is rinsed off with water.

Finally, laboratory-determined abrasion resistance of the invention prepolymer compositions vary from about 250 to 1,500 revolutions per 0.1 inch of wear in the modified National Bureau of Standards Test, (ASTM D 1630-61), a wear resistance equal to about 50 to 200% of that of good quality rubber soles used on athletic and sport shoes or good quality heels on all kinds of shoes, depending upon the prepolymer composition used and the type of sole or heel against which it is compared.

Another valuable use of the invention repair system is adhering together and/or repairing any product made with or from leather, natural or synthetic rubber, wood, cork, paper products, any synthetic resin, except those made with 50% or more of ethylene and propylene, such as vinyl resins, methacrylate or acrylate resins, styrene polymer and copolymer resins, and the like, and all kinds of natural and synthetic fabrics except those containing 50% or more of polyethylene or polypropylene fibers. In addition, when extreme bond strength is not required, the invention compositions may be used to adhere glass or metal substrates to themselves or to other materials, as described previously—taking advantage of the fair-to-good adhesion properties the composition also has for these substrates.

When using the invention repair system for this purpose, one preferred method is: after cleaning, if dirty, both surfaces to be joined and allowing them to dry if an organic solvent or water is used, apply from the tube or cartridge a thin coating of the prepolymer composition to both surfaces; allow any solvent present to evaporate until the composition coating no longer transfers when touched (about 15–90 minutes depending on prepolymer solvent and thickness and ambient conditions); then join and hold the surfaces together until the prepolymer cures to a satisfactory adhesive bond (typically about 2–24 hours depending on ambient conditions, type of surfaces, curing speed of the prepolymer composition, and initial bond strength required). Even when no solvent is present, it is advantageous, to expose the prepolymer adhesive coatings on both surfaces to ambient conditions for a short period, such as 15–45 minutes, to facilitate moisture pickup and hence rate of cure of the prepolymer composition bond. This is particularly important when both surfaces being joined are essentially moisture vapor impermeable. Further, when feasible, for example when one or both surfaces are relatively non-porous, only one surface (preferably the more porous one) need be coated with a generous coating of the composition, which when mated with the other surface after a suitable waiting time, as previously described, will wet and coat it and provide an excellent adhesive bond. Because of its outstanding adhesive qualities, the invention prepolymer composition has been unexcelled in adhering separated soles, midsoles, or heels to shoe upers; also in preventing such separations when a bead of the material is placed in the groove where the two are joined together.

Yet another embodiment of the invention, is the use of the invention prepolymer composition to repair rips, tears, and holes in any product made with materials to which the prepolymer composition adheres, such as delineated previously: as, for example, tears and holes in boots, waders, tents, air mattresses, luggage, shoe upers, and the like. In this method, an area about one inch out from the hole or tear is cleaned, if dirty, and if required, the hole backed up or the tear held together with a pressure sensitive adhesive tape on the opposite side. The prepolymer composition is then applied from the tube or cartridge onto the hole or tear and leveled out with a stick, knife, spatula, or the like, beyond the area being repaired for a distance of about ¼ to ¾ inches. The repaired area is maintained level (required only when the prepolymer composition is flowable) until the prepolymer composition cures, about 18 to 48 hours depending upon the repair thickness and curing speed and ambient conditions. After cure, the pressure sensitive tape, if used, is removed from the side opposite the repair. Typically, repair thicknesses of about 12 to 100 mils are used, depending upon the repair strength and flexibility desired. Because of the high modulus and tensile strength of the invention prepolymer composition, no backup reinforcement, such as fabric, is required, although such reinforcement may be used if desired—merely press the reinforcement into the repair anytime 15–90 minutes after casting the prepolymer composition, while it is still tacky and capable of wetting and adhering to the reinforcement. When repairing holes and tears in rubber products, good repair adhesion is assured by first roughening the area around the repair with sandpaper, a wire brush, or the like, then cleaning the roughened area with a rag soaked with an oil-dissolving solvent or by washing with an aqueous-detergent mixture (oil dispersing) followed by rinsing throughly with water and drying before applying the invention prepolymer composition. When for aesthetics, it is desired that the repair not be visible, the repair is made on the back side of the article being repaired.

Lastly, as is known, to minimize cure times, it is preferred that the prepolymer composition in the aforedescribed repair applications be cured at temperatures of at least about 60° F. Lower temperatures may be used if longer cure times are acceptable.

EXAMPLES 1 TO 6

Six different urethane prepolymer repair systems shown in the Table were made as follows using virtually water-free ingredients and under a blanket of dry nitrogen: The polytetramethylene ether glycol, heated to 160° F. and liquid, was first added to a reaction vessel, then toluol carefully added to form a layer thereabove, then Linde 5A molecular sieve powder, and catalyst and 1,4-butanediol, when used, were added and the batch agitated vigorously for about two minutes. Flaked p,p¹-diphenylmethane diisocyanate was then added and the batch agitated about two minutes more to melt and dissolve the diisocyanate. About five minutes after admixing the diisocyanate, the batch was loaded into nitrogen-purged blind-opening (3/16 inch orifice), collapsible metal tubes. The batch was still very fluid and at a temperature of about 100° to 110° F. during filling, which required about ten minutes. It was estimated that the prepolymer compositions in the last tubes were not more than about 10% polymerized. The filled tubes were then aged about 24 hours at 140° F., cooled, and the compositions squeezed from the tubes into National Bureau of Standard Test Abrasion molds, and unto black natural rubber tensile sheets (roughened with sandpaper and washed twice with a toluol-soaked rag) in thickness varying from about 40 to 75 mils. After curing eight days under ambient conditions, the abrasion resistance and adhesion of the test specimens was determined. The test data obtained is also shown in the Table on the following page.

TABLE

| Example[1] | 1 | 2 | 3 | 4 | 5 | 6 |
|---|---|---|---|---|---|---|
| TERACOL[2] 1000 (500 assumed OH eg. wt.) | 350 | — | — | — | | |
| TERACOL 2900 (1450 assumed OH eg. wt.) | — | 406 | — | — | | |
| TERACOL 2000 (1022 OH eg. wt.) | — | — | 400 | 400 | 300[6] | 305.6 |
| 1,4-butanediol | — | — | — | — | — | 3.4 |
| LINDE 5A Powder | 3.5 | 4 | 4 | — | 2.4 | 2.1 |
| MONDUR M[3] | 105 | 53 | 67 | 67 | 52.2 | 63.4 |

TABLE-continued

| Example[1] | 1 | 2 | 3 | 4 | 5 | 6 |
|---|---|---|---|---|---|---|
| Toluol | 168 | 128 | 129 | 210 | 100.2 | 105.6 |
| COCURE 32[4] | — | | | | 0.063 | 0.063 |
| Prepolymer Mol. Wt. | 6500 | 6550 | 6512 | 6512 | 5636 | 5629 |
| Prepolymer NCO | 1.29% | 1.28% | 1.29% | 1.29% | 1.49% | 1.49% |
| Composition Total Solids | 73.2% | 78.4% | 78.5% | 69% | 78% | 78% |
| NBS Abrasion[5] | 359 | 800 | 453 | 472 | 1020 | 1169 |
| Shore A Hardness | 66 | 68 | 66 | 63 | 70 | 72 |
| Adhesion (lbs/in.) | 3.5 | 7.0 | 7.0 | 3.5 | 6.0 | 10+ (tears rubber) |

Footnotes
[1] All parts by weight.
[2] TERACOL: E. I. DuPont's tetramethylene ether glycol.
[3] MONDUR M: Mobay Chemical's flaked solid p,p-diphenylmethane diisocyanate.
[4] COCURE 32: Cosan Chemical's 60%-active organomercurial urethane catalyst.
[5] Number of revolutions to wear away 0.1 inch in National Bureau of Standards Test (ASTM D 1630-61).
[6] Hydroxyl equivalent weight = 1031.

The data in the Table shows: that prepolymer compositions made with polytetramethylene ether glycol having hydroxyl equivalent weights of about 500 to 1,500 give good abrasion resistance and adhesion, with the glycols having higher equivalent weights giving the best properties (Examples 1–3); that molecular sieves are not required in prepolymer compositions using precursors virtually free of water (Example 4); that lower-molecular-weight prepolymer compositions are harder and more abrasion resistant (Example 5); and that low-molecular-weight extenders, such as 1,4-butanediol, in the prepolymer compositions tend to give somewhat harder repairs and slightly improved abrasion resistance (Example 6). All the compositions were extrudable from the tubes after aging 30 days at 120° F., indicating satisfactory long-term shelf life. All gave tough elastomers having a 100% modulus exceeding 200 psi. Finally, all exhibited good adhesion to the natural rubber sheet on which the abrasion test blocks were cast even though there were an estimated 3 to 10% carbon dioxide bubbles throughout the blocks.

What is claimed is:

1. A urethane prepolymer repair system which comprises:
   a urethane prepolymer composition capable of curing to an elastomer upon exposure to atmospheric moisture and having:
   a total solids of 60–100%,
   a cured Durometer hardness of 50–90 Shore A,
   a cured 100% modulus of at least 200 psi, and
   a shelf life of at least 30 days at 120° F.;
   said urethane prepolymer composition containing a urethane prepolymer made essentially from a polytetramethylene ether glycol or mixture of glycols having a hydroxyl equivalent weight of about 300 to 2,000, and a stoichiometric excess of an organic polyisocyanate;
   said polytetramethylene ether glycol urethane prepolymer having:
   an isocyanate content of about 0.8–2.4%, and
   an average molecular weight of about 3,500–10,500;
   said urethane prepolymer composition being packaged in and dispensed from a moisture-impermeable container having a closable dispensing orifice and means to reduce the volume of the container and thereby extrude the urethane prepolymer composition through the orifice without introducing ambient air into the container.

2. The repair system of claim 1 wherein the polytetramethylene ether glycol urethane prepolymer has an isocyanate content of about 1.1% to 1.9% and an average molecular weight of about 4,500 to 7,500.

3. The repair system of claims 1 or 2 wherein the organic polyisocyanate is 4,4¹-diphenylmethane diisocyanate.

4. The repair system of claim 1, 2, or 3 wherein the urethane prepolymer composition has a total solids of 70–90%.

5. The repair system of claim 1 wherein the urethane prepolymer composition contains 0.3 to 1.5%, per 100% of the composition, of a molecular sieve in excess of that required to scavenge any water present in the composition ingredients.

6. The repair system of claim 1 wherein the urethane prepolymer composition is virtually devoid of free organic polyisocyanate.

7. The repair system of claim 1 wherein the polytetramethylene ether glycol urethane prepolymer is made essentially only from difunctional prepolymer precursors.

8. The repair system of claim 1 wherein the polytetramethylene ether glycol urethane prepolymer is incompletely polymerized when loaded into the container and the polymerization is completed in the filled container.

9. A method of restoring worn-down areas of footwear soles and heels which comprises applying the urethane prepolymer composition of the repair system of claim 1, 2, or 3 to the areas, and allowing the composition to cure.

10. A method of adhering together two surfaces which comprises applying the urethane prepolymer composition of the repair system of claim 1, 2, or 3 to one or both of the surfaces, then uniting and maintaining in joined relationship the two surfaces till the prepolymer composition cures to a degree sufficient to adhere the two surfaces together.

11. The method of claim 10 wherein there is an interval of at least 15 minutes between the steps of applying the urethane prepolymer composition and uniting the two surfaces.

12. A method of repairing holes and tears in an article which comprises applying to a thickness of at least 10 mils the urethane prepolymer composition of the repair system of claim 1, 2, or 3 onto the hole or tear and the contiguous surrounding area and allowing the composition to cure.

13. A method of making the repair system of claim 1 which comprised filling the container with the polytetramethylene ether glycol urethane prepolymer less than 50% polymerized, then completing the polymerization of the prepolymer in the container.

* * * * *